3,455,911
SULFONAMIDES BEARING A BASIC AMINO ACID RESIDUE
Karl Vogler, Riehen, Switzerland, assignor to Hoffmann-La Roche Inc., Nutley, N.J., a corporation of New Jersey
No Drawing. Filed Dec. 28, 1966, Ser. No. 605,176
Claims priority, application Switzerland, Feb. 24, 1966, 2,702/66
Int. Cl. C07d 51/44, 85/24; A61k 27/00
U.S. Cl. 260—239.65      28 Claims

ABSTRACT OF THE DISCLOSURE

Sulfonamides bearing in the $N^4$-position a basic amino acid residue, prepared by condensing the appropriate basic amino acid with the $N^4$-amino group of a chemotherapeutically active sulfonamide, are described. The end products are antibacterial agents.

---

This invention relates to novel sulfonamide derivatives and a process for the manufacture thereof. More particularly, the invention relates to novel sulfonamides selected from the group consisting of compounds characterized by the formula

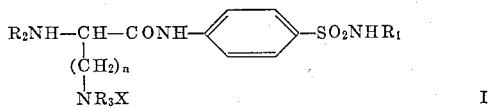

wherein $R_1$ is a five or six membered heterocyclic radical selected from the group consisting of substituted and unsubstituted pyridazinyl, pyrimidinyl, pyrazinyl, triazinyl, thiadiazolyl, pyrazolyl, oxazolyl and isoxazolyl, one or more substituents being independently selected from the group consisting of lower alkyl and lower alkoxy; $R_2$ and $R_3$ are independently selected from the group consisting of hydrogen and protecting groups; $n$ is an integer from 2–4; when $n$ is 2 or 4, X is hydrogen; and when $n$ is 3, X is selected from the group consisting of hydrogen and $R_2HNC(:NH)$—, and $R_3$ is hydrogen, and the pharmaceutically acceptable acid addition salts of compounds of Formula I having a free amino group.

As used herein, the terms "lower alkyl" and "lower alkoxy" are understood to be those having 1–7 carbon atoms, such as methyl, ethyl, propyl, butyl, pentyl, hexyl, heptyl, methoxy, ethoxy, butoxy, propoxy, pentoxy, hexoxy and heptoxy. Preferred are methyl and methoxy.

The compounds of Formula I wherein $R_2$ and $R_3$ are hydrogen are particularly useful as antibacterial chemotherapeutic agents. These compounds are exemplified by the formula

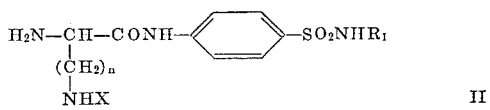

wherein $R_1$ and X are as previously mentioned, and include their pharmaceutically acceptable acid addition salts.

Compounds of Formula II are, for example, 2,6-dimethoxy-4-($N^4$-L-lysyl-sulfanilamido)-pyrimidine;
5,6-dimethoxy-4-($N^4$-L-lysyl-sulfanilamido)-pyrimidine;
2,4-dimethyl-5-($N^4$-L-lysyl-sulfanilamido)-pyrimidine;
5-methoxy-2-($N^4$-L-lysyl-sulfanilamido)-pyrimidine;
5-methyl-3-($N^4$-L-lysyl-sulfanilamido)-isoxazole;
3,4-dimethyl-5-($N^4$-L-lysyl-sulfanilamido)-isoxazole;
3-methoxy-2-($N^4$-L-lysyl-sulfanilamido)-pyrazine;
2,6-dimethyl-4-($N^4$-L-arginyl-sulfanilamido)-pyrimidine;
2-($N^4$-L-lysyl-sulfanilamido)-4,6-diethyl-s-triazine;

and the like.

The compounds of Formula I wherein R is a protecting group are particularly useful as intermediates in the preparation of compounds of Formula II. These compounds are exemplified by the formulas

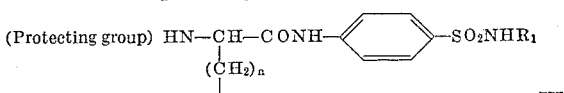

and

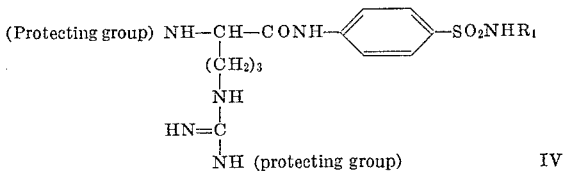

wherein $R_1$ and $n$ are as previously mentioned, and the protecting group is as hereinafter described.

Examples of compounds of Formulas III and IV are:

2,6-dimethoxy-4-[$N^4$-($N^\alpha$,$N^\epsilon$-dicarbobenzoxy-L-lysyl)-sulfanilamido]-pyrimidine;
5,6-dimethoxy-4-[$N^4$-($N^\alpha$,$N^\epsilon$-dicarbobenzoxy-L-lysyl)-sulfanilamido]-pyrimidine;
2,4-dimethyl-5-[$N^4$-($N^\alpha$,$N^\epsilon$-dicarbobenzoxy-L-lysyl)-sulfanilamido]-pyrimidine;
5-methoxy-2-[$N^4$-($N^\alpha$,$N^\epsilon$ - dicarbobenzoxy - L-lysyl) - sulfanilamido]-pyrimidine;
5-methyl-3-[$N^4$-($N^\alpha$,$N^\epsilon$ - dicarbobenzoxy - L - lysyl) - sulfanilamido]-isoxazole;
3,4 - dimethyl - 5 - [$N^4$ - ($N^\alpha$,$N^\epsilon$ - dicarbobenzoxy - L-lysyl)-sulfanilamido]-isoxazole;
3-methoxy-2-[$N^4$-($N^\alpha$,$N^\epsilon$-dicarbobenzoxy - L - lysyl) - sulfanilamido]-pyrazine;
2,6 - dimethoxy - 4 - [$N^4$ - ($N^\alpha$ - carbobenzoxy - $N^G$ - nitro-L-arginyl)-sulfanilamido]-pyrimidine;
2 - [$N^4$ - ($N^\alpha$,$N^\epsilon$ - dicarbobenzoxy - L - lysyl) - sulfanilamido]-4,6-diethyl-s-triazine; and the like.

In accordance with this invention, the compounds of Formulas III and IV are prepared by condensing the appropriate basic amino acid, whose amino groups are protected, with the $N^4$-amino group of a chemotherapeutically active sulfonamide. Upon removal of the protecting groups, compounds of Formula II are obtained. Thereafter, if desired, compounds of Formula II can be converted into a pharmaceutically acceptable acid addition salt.

Examples of basic α-amino acids utilized in the practice of this invention include those derived from proteins, preferably α,γ-diaminobutyric acid, lysine, ornithine and arginine. In the practice of the invention, both the optically active forms and the racemakes of the basic amino acids may be used. However, because of physiological considerations, the use of the L-forms is preferred. The amino groups of the basic amino acids utilized in the process of this invention are protected by utilizing means well known in the art of peptide chemistry, for example, the reaction of the free amino group with carbobenzoxy chloride. Protecting groups include, for example, carbobenzoxy, t-butyloxycarbonyl, formyl, benzyl, dibenzyl, phthalyl, trifluoroacetyl, nitro and the like.

As the chemotherapeutically active sulfonamide reactants there can be used those derived from heterocyclic compounds. Examples of these compounds include, among others, sulfanilamido-1,2-diazines, preferably 6-methoxy-3 - sulfanilamido-pyridazine; sulfanilamido - 1,3 - diazines, preferably 2,4-dimethoxy-6-sulfanilamidopyrimidine, 5,6-dimethoxy-4-sulfanilamidopyrimidine, 5-methoxy - 2 - sulfanilamidopyrimidine, 5 - methyl - 2 - sulfanilamidopyrimidine, 4,6 - dimethoxy - 2 - sulfanilamidopyrimidine, 6 - methoxy - 4-sulfanilamidopyrimidine, 5-methyl-6-methoxy-4-sulfanilamidopyrimidine, 2,4-dimethyl-5-sulfanilamidopyrimidine and 4,6-dimethyl-2 - sulfanilamidopyrimidine; sulfanilamido-1,4-diazines, preferably 3-methoxy-2-sulfanilamidopyrazine; sulfanilamidotriazines, preferably 4,6-diethyl-2 - sulfanilamido-s-triazine; sulfanilamidothiadiazoles, preferably 5-methyl-2-sulfanilamido-1,3,4-thiadiazole; sulfanilamidopyrazoles, preferably 2-phenyl-3-sulfanilamidopyrazole; sulfanilamido-oxazoles, preferably 4,5-dimethyl-sulfanilamide-oxazole and sulfanilamido-isoxazoles, preferably 5-methyl-3-sulfanilamido-isoxazole, 4-methyl-3-sulfanilamido-isoxazole, and 3,4-dimethyl-5-sulfanilamido-isoxazole.

The condensation of the carboxyl group of the N-protected basic amino acid with the $N^4$-amino group of the sulfonamide can be effected, for example, utilizing known methods for linking the —CO—NH-bonds in peptide chemistry. Such methods include, for example:

(a) The reaction of the sulfonamide with the N-protected aminocarboxylic acid in the presence of a condensation agent exemplified by a carbodiimide (e.g. dicyclohexylcarbodiimide) of carbonyl diimidazole, or of 2-ethyl-5-meta-sulfonato-phenyl-isoxazolium. Such condensation agents allow for the utilization of aminocarboxylic acids having free [non-activated] carboxyl functions.

(b) The reaction of the sulfonamide with reactive derivatives of the N-protected aminocarboxylic acid. Such derivatives include the azide, the halide, for example, the chloride, the energy-rich esters such as the phenyl, p-nitrophenyl, thiophenyl or cyanomethyl ester, and the mixed anhydride with an inorganic or organic acid (e.g. an ester of chloroformic acid such as ethyl chloroformate). The reactive or activated derivatives of the carboxyl component may be reacted with the sulfonamide component at room or lower temperatures.

Another method for activating the carboxyl group of the N-protected aminocarboxylic acid is that disclosed by Anderson in the J. Am. Chem. Soc. 74 (1952), 5304 and 5309, which comprises converting the carboxyl group into a —COOP$(OC_2H_5)_2$ group using tetraethylpyrophosphite $[(C_2H_5O_2{=}P{-}O{-}P{=}(OC_2H_5)_2]$.

Upon completion of the condensation reaction, the protecting groups are cleaved from desired products in a manner known per se. Thus, for example, benzyl and carbobenzoxy protecting groups can be cleaved by hydrogenolysis with palladium on carbon or by sodium in liquid ammonia. Additionally, the carbobenzoxy protecting group can be removed with hydrogen bromide in glacial acetic. The t-butyloxycarbonyl protecting group can be removed by mild acid action (e.g. with acetic acid). Cleavage of the formyl residue proceeds under mild acid action. Cleavage of the trifluoroacetyl residue proceeds under mild alkali action. The phthalyl group is selectively cleavable by means of hydrazine.

The compounds of Formula I having free amino groups form acid addition salts and such salts are also within the scope of this invention. Thus, the compounds of Formula I having free amino groups, more particularly compounds of Formula II, form pharmaceutically acceptable addition salts with, for example, both pharmaceutically acceptable organic and inorganic acids such as hydrochloric acid, sulfuric acid, phosphoric acid, oxalic acid, acetic acid, p-toluenesulfonic acid, sulfosalicylic acid, β-naphthoic acid, citric acid, benzoic acid, sorbic acid and the like.

The novel compounds of Formula II, including their pharmaceutically acceptable addition salts, possess the antibacterial chemotherapeutic activity of the precursor sulfonamides, whose activity is well known and established in the art. Advantageously, however, the compounds of Formula II, as compared to the precursor sulfonamides, exhibit a high degree of solubility which makes it possible to effectively formulate them into concentrated solutions, syrups and injectable preparations.

The novel compounds of Formulas III and IV are useful as intermediates for the novel compound of Formula II.

The compounds of Formula II, including the pharmaceutically acceptable acid addition salts can be administered orally or parenterally with dosages adjusted to individual requirements. Such administration is accomplished by incorporating a therapeutic dosage in a conventional dosage form such as tablets, capsules, preferably, elixirs, suspensions, solutions, injectables or the like. They can be administered in admixture with conventional pharmaceutical carriers or excipients such as, for example, corn starch, calcium stearate, magnesium carbonate calcium silicate, dicalcium phosphate, lactose and the like. Moreover, they can be administered in the presence of buffers, or agents used to adjust isotonicity. Additionally, the pharmaceutical dosage form can, if desired, be subjected to conventional pharmaceutical expedients, such as, for example, sterilization and the like. The dosage forms can also contain other therapeutically valuable substances.

The quantity of active medicament which is present in any of the above-described dosage forms is variable. It is preferred, however, to provide a unit dose containing from about 200 mg. to about 2000 mg. of the Formula II base, or an equivalent amount of a medicinally acceptable acid addition salt of the Formula II base. For parenteral administration, it is preferred to provide a solution containing from about 50 mg./ml. to about 150 mg./ml. of the Formula II base, or an equivalent amount of a medicinally acceptable acid addition salt of the Formula II base. As stated above, the dosage can be adjusted to individual requirements.

The frequency with which any such dosage form will be administered to a patient will vary, depending upon the quantity of active medicament present therein and the needs and requirements of the patient, as diagnosed by the prescribing physician. Under ordinary circumstances, however, up to about 50 mg./kg. of the compound can be administered daily in several dosages. It is to be understood, however, that the dosages set forth therein are exemplary only and that they do not to any extent limit the scope or practice of this invention.

The invention will be understood better by reference to the following examples which are given for illustration purposes only and are not meant to limit the invention. Temperatures, unless otherwise stated, are expressed in degrees centigrade.

Example 1

69 ml. of ethyl chloroformate were added dropwise with stirring at —10° to a solution of 256 g. of $N^\alpha,N^\epsilon$-dicarbobenzoxy-L-lysine and 96 ml. of triethylamine in 800 ml. of dimethylformamide. The mixture was stirred over a period of 15 minutes at —10°, treated with a —10° solution of 192 g. of 2,6-dimethoxy-4-sulfanilamido-pyrimidine in 500 ml. of dimethylformamide and stirred for an hour at 10° and 16 hours at 25°. The triethylamine hydrochloride was removed by filtering with suction. The filtrate was evaporated under vacuum at 70°. The remaining residue, a syrup, was dissolved in 2 liters ethyl acetate and washed with 5% sodium bicarbonate solution. The remaining solution was dried over magnesium sulphate and then evaporated in vacuum to a volume of 500 ml. To effect crystallization, this solution was treated portionwise with 1 liter of ether with stirring and stored at 0° for 20 hours. The product obtained was 2,6 - dimethoxy - 4 - [$N^4$ - ($N^\alpha,N^\epsilon$ - dicarbobenzoxy - L - lysyl) - sulfanilamido] - pyrimidine, having a melting point of 152–154°; and $[\alpha]_D^{25}{=}{-}4.1°$ (c.=1.2 in ethanol).

238 g. of this compound were hydrogenated in 700 ml. of glacial acetic using 35 g. of palladium on carbon until no more hydrogen was taken up. The catalyst was removed by filtration and the filtrate evaporated in vacuum. The residual resin was dissolved with warming in 150 ml. of water, filtered and treated portionwise at 0° with 170 ml. of conc. ammonia. The resulting solidified mass was mixed with 50 ml. of 3 N ammonia, stored at 0° for 2 hours, filtered with suction, and rinsed with 150 ml. of ice-cold 3 N ammonia. This crude product was dissolved in 350 ml. of boiling water, filtered, cooled, diluted with 240 ml. of 3 N ammonia and crystallized at 0°. After filtering with suction, washing with 230 ml. of ice-cold 3 N ammonia, and drying in vacuum at 90°, there was obtained 2,6-dimethoxy-4-(N$^4$-L - lysyl - sulfanilamido)-pyrimidine which melted from 140° with decomposition; and $[\alpha]_D^{22} = +20.8°$ (c.=2 in methanol).

Example 2

10.5 ml. of ethyl chloroformate were added dropwise with stirring at —10° to solution of 41.4 g. of N$^\alpha$,N$^\epsilon$-dicarbobenzoxy-L-lysine in 150 ml. of dimethylformamide and 14 ml. of triethylamine. After 15 minutes, the mixture was treated with a solution of 31 g. of 5,6-dimethyl-4-sulfanilamido-pyrimidine in 60 ml. of dimethylformamide and further stirred for 1 hour at —10° and 16 hours at 25°. The trimethylamine hydrochloride was removed by filtration with suction, and the filtrate was evaporated in vacuum at 70°. The resulting syrup was dissolved in 1 liter of ethyl acetate, washed with 1 N hydrochloric acid, water, 10% sodium bicarbonate solution and 10% sodium chloride solution. This was followed by drying over magnesium sulphate and evaporation under vacuum. After crystallization from ethyl acetate, the residue yielded 5,6-dimethoxy-4-[N$^4$-(N$^\alpha$,N$^\epsilon$-dicarbobenzoxy-L-lysyl)-sulfanilamido]-pyrimidine, having a melting point 192–194°; and $[\alpha]_D^{25} = +5.4°$ (c.=2 in dimethylformamide.

24 g. of this compound were hydrogenated in a mixture of 50 ml. of glacial acetic, 50 ml. of methanol and 50 ml. of dimethylformamide with 5 g. of palladium on carbon until no more hydrogen was taken up. The catalyst was removed by filtration. The filtrate was concentrated under vacuum, evaporated twice with water and methanol, dissolved in 50 ml. of methanol and made alkaline with 5% methanolic ammonia solution. Upon treating this solution with 600 ml. of ethanol a precipitate formed which was removed by filtering under suction, washed with ethanol and dried. The crude product was dissolved in 60 ml. of methanol containing a little 5% methanolic ammonia solution and reprecipitated in 600 ml. of ethanol as above. After filtering under suction and drying, there was obtained as a transparent was 5,6-dimethoxy-4-(N$^4$-L-lysyl-sulfanilamido)pyrimidine, having a melting point of 155–157°; and $[\alpha]_D^{25} = +27.8°$ (c.=2 in water).

Example 3

10.5 ml. of ethyl chloroformate were added dropwise with stirring at —10° to a solution of 41.4 g. of N$^\alpha$,N$^\epsilon$-dicarbobenzoxy-L-lysine and 14 ml. of triethylamine in 150 ml. of dimethylformamide. Fifteen minutes later the mixture was treated with a solution of 27.8 g. of 2,4-dimethyl-5-sulfanilamido-pyrimidine in 80 ml. of dimethylformamide and stirred for one hour at —10° and 16 hours at 25°. After removing the triethylamine hydrochloride by filtration with suction, the filtrate was evaporated under vacuum at 70°. The residual syrup was dissolved in 800 ml. of ethyl acetate and washed with 1 N hydrochloric acid, 10% sodium chloride solution, 10% sodium bicarbonate solution and 10% sodium chloride solution, dried over magnesium sulphate and evaporated under vacuum. The residue was crystallized from ethyl acetate at 0° and yielded 2,4-dimethyl-5-[N$^4$-(N$^\alpha$,N$^\epsilon$-dicarbobenzoxy-L-lysyl)-sulfanilamido]-pyrimidine, having a melting point of 172–174°; and $[\alpha]_D^{25} = +7.6°$ (c.=2 in dimethylformamide). 18 g. of this compound were hydrogenated in 100 ml. of dimethylformamide and 40 ml. of glacial acetic with 3 g. of palladium on carbon until no more hydrogen was taken up. The catalyst was removed by filtration. The filtrate was evaporated in vacuum and the residual syrup was evaporated twice with water. The resulting oil was dissolved in ethanol and precipitated by stirring into ethyl acetate. The precipitate was removed by filtration with suction and again reprecipitated as above from a mixture of ethanol and ethyl acetate. After filtering with suction and drying, the acetate of 2,4-dimethyl-5-(N$^4$-L-lysyl-sulfanilamido)-pyrimidine was obtained, having a melting point from 98° (slow decomposition); and $[\alpha]_D^{25} = +28.6°$ (c.=2 in water).

Example 4

1.6 ml. of ethyl chloroformate were added dropwise with stirring at —10° to a solution of 6.2 g. of N$^\alpha$,N$^\epsilon$-dicarbobenzoxy-L-lysine in 30 ml. of dimethylformamide and 2.3 ml. of triethylamine. After 15 minutes, a solution of 4.2 g. of 2-sulfanilamido-5-methoxy-pyrimidine in 20 ml. of dimethylformamide was added and the mixture was stirred for 1 hour at —10° and overnight at 25°. The reaction mixture was poured into ice-water and the resulting residue was taken up in ethyl acetate, washed with 1 N hydrochloric acid, 10% sodium chloride solution, 10% sodium bicarbonate solution and 10% sodium chloride solution. The solution was dried over magnesium sulphate and evaporated under vacuum. The residue, crystallized from ethyl acetate, yielded 5-methoxy-2-[N$^4$-(N$^\alpha$,N$^\epsilon$-dicarbobenzoxy-L-lysyl) sulfanilamido] - pyrimidine, having a melting point of 156–159°. 22 g. of this compound were hydrogenated in 700 ml. of glacial acetic with 3 mg. of palladium on carbon until no more hydrogen was taken up. The catalyst was removed by filtration and the filtrate evaporated under vacuum. The residue was evaporated twice with ethanol, dissolved in ethanol and stirred into ethyl acetate. After recrystallization from a mixture of ethanol and ethyl acetate, there was obtained the acetate of 5-methoxy-2-(N$^4$-L-lysyl-sulfanilamido)-pyrimidine, having a melting point from 80° (slow decomposition); and $[\alpha]_D^{25} = +7.5°$ (c.=2 in water).

Example 5

10.5 ml. of ethyl chloroformate were added dropwise with stirring at —10° to a solution of 41.4 g. of N$^\alpha$,N$^\epsilon$-dicarbobenzoxy-L-lysine in 150 ml. of dimethylformamide and 14 ml. of triethylamine. After 15 minutes the mixture was treated with a solution of 25.3 g. of 5-methyl-3-sulfanilamido-isoxazole in 60 ml. of dimethylformamide and stirred for 1 hour at —10° and 16 hours at 25°. The triethylamine hydrochloride was removed by filtration with suction, the filtrate evaporated in vacuum at 70° and the resulting residue taken up in 800 ml. of ethyl acetate. After crystallization from ethanol, there was obtained 5-methyl-3-[N$^4$-(N$^\alpha$,N$^\epsilon$-dicarbobenzoxy - L - lysyl)-sulfanilamido]-isoxazole, having a melting point of 180–181°; and $[\alpha]_D^{25} = +3.6°$ (c.=2 in dimethylformamide). 18 g. of this compound were hydrogenated in 40 ml. of glacial acetic and 150 ml. of dimethylformamide with 3 g. of palladium on carbon until no more hydrogen is taken up. The catalyst was removed by filtration and the filtrate evaporated under vacuum. The resulting residue was evaporated twice with water. Thereafter, the residue was dissolved in a little water and stirred into conc. ammonia. The precipitated was reprecipitated in a similar manner from a concentrated aqueous solution with conc. ammonia, whereupon there was obtained 5-methyl-3-(N$^4$-L-lysyl-sulfanilamido)-isoxazole, having a melting point from 180° (slow decomposition); and $[\alpha]_D^{25} = +60.6°$ (c.=2 in 10 percent acetic acid).

Example 6

10.5 ml. of ethyl chloroformate were added dropwise with stirring at —10° to a solution of 41.4 g. of N$^\alpha$,N$^\epsilon$-dicarbobenzoxy-L-lysine in 150 ml. of dimethylformamide and 14 ml. of triethylamine. After 15 minutes, a solution of 26.7 g. of 3,4-dimethyl-5-sulfanilamido-isoxazole in 60 ml. of diethylformamide was added to the mixture and further stirred for 1 hour at —10° and 16 hours at 25°. The triethylamine hydrochloride was removed by filtration under suction and the filtrate evaporated in vacuum at 70°. The residual syrup was taken up in 1 liter of ethyl acetate and washed with 1 N hydrochloric acid, water, 10% sodium bicarbonate solution and 10% sodium chloride solution, dried over magnesium sulphate and evaporated in vacuum. The residue was recrystallized from ethyl acetate and ether and from dioxan and ether and yielded 3,4-dimethyl-5-[N⁴ - (Nᵅ,Nᵉ - dicarbobenzoxy-L-lysyl)-sulfanilamido]-isoxazole, having a melting point 201–203° (dec.); and $[\alpha]_D^{25} = +4.9°$ (c.=1 in dimethylformamide). 29 g. of this compound were hydrogenated in a mixture of 150 ml. of acetic acid and 250 ml. of dimethylformamide with 3 g. of palladium on carbon until no more hydrogen was taken up. The catalyst was removed by filtration and the filtrate evaporated under vacuum. The resulting syrup was evaporated twice with water. The residual resin was dissolved in a little water, made alkaline with conc. ammonia, filtered and precipitated by dropping with stirring into alcohol. After filtration with suction, the precipitate was dissolved in 20 ml. of water, treated with 1 ml. of conc. ammonia and poured with stirring into 500 ml. of alcohol. Whereupon, there was obtained 3,4-dimethyl-5-(N⁴-L-lysyl-sulfanilamido)-isoxazole as a white powder, having a melting point of 192–195° (dec.); and $[\alpha]_D^{25} = +27°$ (c.=2 in water).

Example 7

3.4 ml. of ethyl chloroformate were added dropwise with stirring at −10° to a solution of 13.2 g. of Nᵅ,Nᵉ-dicarbobenzoxy-L-lysine in 30 ml. of dimethylformamide and 4.5 ml. of triethylamine. After 15 minutes, the mixture was treated with a solution of 8.9 g. of 3-methoxy-2-sulfanilamido-pyrazine and further stirred for 1 hour at −10° and 16 hours at 25°. The triethylamine hydrochloride was removed by filtration with suction and the filtrate evaporated with vacuum at 70°. The residue was taken up in 800 ml. of ethyl acetate and washed with 1 N hydrochloric acid, water, 10% sodium bicarbonate solution and 10% sodium chloride solution. After working up and recrystallization from a little dimethylformamide with the addition of ethanol, there was obtained 3-methoxy-2-[N⁴-(Nᵅ,Nᵉ-dicarbobenzoxy-L-lysyl) - sulfanilamido] - pyrazine, having a melting point 194–196°; and $[\alpha]_D^{25} = +5.4°$ (c.=2 in dimethylformamide). 14 g. of this compound was hydrogenated in 30 ml. of glacial acetic and 90 ml. of dimethylformamide with 2 g. of palladium on carbon until no more hydrogen was taken up. The catalyst was removed by filtration and the filtrate was evaporated with vacuum. The remaining resin was evaporated twice with water, and dissolved in a little water. This solution made alkaline with conc. ammonia, filtered and the filtrate stirred into 500 ml. of alcohol. The precipitate which formed was recrystallized from water and yielded 3-methoxy-2-(N⁴-L-lysyl-sulfanilamido)-pyrazine, having a melting point of 173–175°; and $[\alpha]_D^{25} = +26.3°$ (c.=2 in water).

Example 8

35.2 g. of Nᵅ-carbobenzoxy-Nᴳ-nitro-L-arginine was dissolved in 150 ml. of dimethylformamide and 15.3 ml. of triethylamine, and slowly treated at −10° with stirring with 10.5 ml. of ethyl chloroformate. The solution was further stirred for 15 minutes and treated with a pre-cooled solution of 31 g. of 2,6-dimethoxy-4-sulfanilamido-pyrimidine in 100 ml. of dimethylformamide. The mixture was thereafter stirred for 1 hour at −10° and 16 hours at 25°. Whereupon the solution was stirred into 1.5 liters of ice-water and the precipitate which formed was taken up in 800 ml. of ethyl acetate. After working up, there was obtained 2,6 - dimethoxy - 4 - [N⁴ - (Nᵅ-carbobenzoxy-Nᴳ-nitro-L-arginyl) - sulfanilamido]-pyrimidine which did not crystallize but had a chromatographically uniform thin layer. 45 g. of this compound were hydrogenated in 200 ml. of glacial acetic with 10 g. of palladium on carbon until no more hydrogen was taken up. The catalyst was removed by filtration and the filtrate evaporated under vacuum. The residue was dissolved in water with the additition of a little 1 N hydrochloric acid and filtered over Amberlite IRA 401 (OH⁻ Form). The eluate was evaporated under vacuum and the residue reprecipitated twice from methanol with ethyl acetate. This yielded 2,6-dimethyl-4-(N⁴-L-arginyl-sulfanilamido) - pyrimidine, having a melting point from 90° (slow decomposition).

Example 9

3.4 ml. of ethyl chloroformate was added dropwise with stirring at −10° to a solution of 13.5 g. of Nᵅ,Nᵉ-dicarbobenzoxy-L-lysine in 50 ml. of dimethylformamide and 4.6 ml. of triethylamine. After 15 minutes, the mixture was treated with a solution of 10 g. of 2-sulfanilamido-4,6-diethyl-s-triazine in 50 ml. of dimethylformamide. This mixture was stirred for 1 hour at −10° and 16 hours at 25°. The triethylamine hydrochloride which formed was removed by filtration under suction and the filtrate evaporated in vacuum. The residue was dissolved with 250 ml. of ethyl acetate and worked up. After recrystallization from ethyl acetate and petroleum ether and from ethanol, there was obtained 2[N⁴-(Nᵅ,Nᵉ-dicarbobenzoxy - L-lysyl)-sulfanilamido]-4,6-diethyl-s-triazine, having a melting point of 168–169°; and $[\alpha]_D^{22} = +6.02°$ (c.=2 in dimethylformamide).

9 g. of this compound were hydrogenated in 50 ml. of dimethylformamide and 10 ml. of glacial acetic with 0.5 g. of 5% palladium on carbon until no more hydrogen was taken up. The catalyst was removed by filtration and the filtrate evaporated in vacuum. The residue was dissolved in 25 ml. of ethanol and the solution stirred into 250 ml. of ethyl acetate. The precipitate which formed was once more reprecipitated in a similar manner to yield the acetate of 2-[N⁴-L-lysyl-sulfanilamido]-4,6-diethyl-s-triazine, having a melting point from 120° (slow dec.); $[\alpha]_D^{22} = +31.5$ (c.=2 in water).

Example 10

Injectable solution:
2,6 - dimethoxy - 4 - (N⁴-L-lysyl-sulfanilamido)-pyrimidine _____ g__ 100
1 N HCl _____ ml__ 290
Aqua. bidest. steril. _____ml Ad__ 1000

Variations in the invention can be undertaken by those skilled in the art without departing from the scope or spirit of the invention.

I claim:
1. A compound selected from the group consisting of compounds characterized by the formula

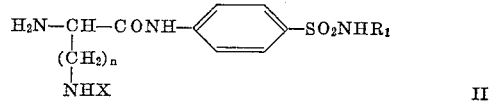

wherein $R_1$ is a five or six membered heterocyclic radical selected from the group consisting of 3-pyridazinyl, 2-pyrimidinyl, 4-pyrimidinyl, 5-pyrimidinyl, 6-pyrimidinyl, 2-pyrazinyl, 2-s-triazinyl, 2-1,3,4-thiadiazolyl, 3-pyrazolyl, 3-isoxazolyl and 5-isoxazolyl, which may be substituted with one to two substituents independently selected from the group consisting of lower alkyl and lower alkoxy; $n$ is an integer from 2–4; when $n$ is 2 or 4, X is hydrogen; and when $n$ is 3, X is selected from the group consisting of hydrogen and guanyl, and their pharmaceutically acceptable acid addition salts.

2. A compound in accordance with claim 1 wherein $R_1$ is 4-pyrimidinyl having one to two substituents independently selected from the group consisting of lower alkyl and lower alkoxy.

3. A compound in accordance with claim 1 wherein $R_1$ is 2-pyrazinyl having one to two substituents independently selected from the group consisting of lower alkyl and lower alkoxy.

4. A compound in accordance with claim 1 wherein $R_1$ is 2-s-triazinyl having one to two substituents independently selected from the group consisting of lower alkyl and lower alkoxy.

5. A compound in accordance with claim 1 wherein $R_1$ is 5-isoxazolyl having one to two substituents independently selected from the group consisting of lower alkyl and lower alkoxy.

6. A compound in accordance with claim 1, 2,6-dimethoxy-4-($N^4$-L-lysyl-sulfanilamido)-pyrimidine.

7. A compound in accordance with claim 1, 5,6-dimethoxy-4-($N^4$-L-lysyl-sulfanilamido)-pyrimidine.

8. A compound in accordance with claim 1, 2,4-dimethyl-5-($N^4$-L-lysyl-sulfanilamido)-pyrimidine.

9. A compound in accordance with claim 1, 5-methoxy-2-($N^4$-L-lysyl-sulfanilamido)-pyrimidine.

10. A compound in accordance with claim 1, 5-methyl-3-($N^4$-L-lysyl-sulfanilamido)-isoxazole.

11. A compound in accordance with claim 1, 3,4-dimethyl-5-($N^4$-L-lysyl-sulfanilamido)-isoxazole.

12. A compound in accordance with claim 1, 3-methoxy-2-($N^4$-L-lysyl-sulfanilamido)-pyrazine.

13. A compound in accordance with claim 1, 2,6-dimethoxy-4-($N^4$-L-arginyl-sulfanilamido)-pyrimidine.

14. A compound in accordance with claim 1, 2-($N^4$-L-lysyl-sulfanilamido)-4,6-diethyl-s-triazine.

15. A compound selected from the group consisting of

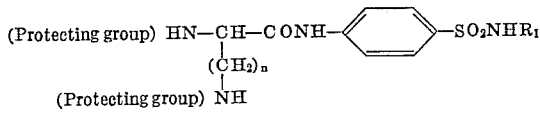

and

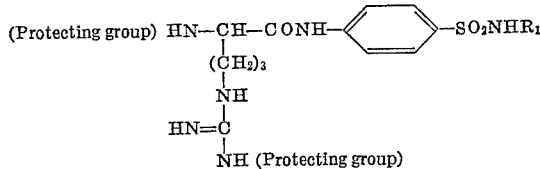

wherein $R_1$ is a five or six membered heterocyclic radical selected from the group consisting of 3-pyridazinyl, 2-pyrimidinyl, 4-pyrimidinyl, 5-pyrimidinyl, 6-pyrimidinyl, 2-pyrazinyl, 2-S-triazinyl, 2-1,3,4-thiadiazolyl, 3-pyrazolyl, 3-isoxazolyl, and 5-isoxazolyl, which may be substituted with one to two substituents independently selected from the group consisting of lower alkyl and lower alkoxy; $n$ is an integer from 2–4; and protecting groups are selected from the group consisting of carbobenzoxy, t-butyloxycarbonyl, formyl, benzyl, dibenzyl, phthalyl, trifluoroacetyl, and nitro.

16. A compound in accordance with claim 15 wherein $R_1$ is 4-pyrimidinyl having one to two substituents independently selected from the group consisting of lower alkyl and lower alkoxy.

17. A compound in accordance with claim 15 wherein $R_1$ is 2-pyrazinyl having one to two substituents independently selected from the group consisting of lower alkyl and lower alkoxy.

18. A compound in accordance with claim 15 wherein $R_1$ is 2-s-triazinyl having one to two substituents independently selected from the group consisting of lower alkyl and lower alkoxy.

19. A compound in accordance with claim 15 wherein $R_1$ is 5-isoxazolyl having one to two substituents independently selected from the group consisting of lower alkyl and lower alkoxy.

20. A compound in accordance with claim 15, 2,6-dimethoxy-4-[$N^4$-($N^\alpha$,$N^\epsilon$-dicarbobenzoxy - L - lysyl)-sulfanilamido]-pyrimidine.

21. A compound in accordance with claim 15, 5,6-dimethoxy-4-[$N^4$-($N^\alpha$,$N^\epsilon$-dicarbobenzoxy - L - lysyl)-sulfanilamido]-pyrimidine.

22. A compound in accordance with claim 15, 2,4-dimethyl-5-[$N^4$-($N^\alpha$,$N^\epsilon$-dicarbobenzoxy - L - lysyl)-sulfanilamido]-pyrimidine.

23. A compound in accordance with claim 15, 5-methoxy-2-[$N^4$-($N^\alpha$,$N^\epsilon$-dicarbobenzoxy - L - lysyl) - sulfanilamido]-pyrimidine.

24. A compound in accordance with claim 15, 5-methyl - 3 - [$N^4$-($N^\alpha$,$N^\epsilon$-dicarbobenzoxy - L - lysyl)-sulfanilamido]-isoxazole.

25. A compound in accordance with claim 15, 3,4-dimethyl-5-[$N^4$ - ($N^\alpha$,$N^\epsilon$-dicarbobenzoxy - L - lysyl)sulfanilamido]-isoxazole.

26. A compound in accordance with claim 15, 3-methoxy-2-[N-($N^\alpha$,$N^\epsilon$-dicarbobenzoxy - L - lysyl) - sulfanilamido]-pyrazine.

27. A compound in accordance with claim 15, 2,6-dimethoxy-4-[$N^4$-($N^\alpha$-carbobenzoxy - $N^G$-nitro-L-arginyl)-sulfanilamido]-pyrimidine.

28. A compound in accordance with claim 15, 2-[$N^4$-($N^\alpha$,$N^\epsilon$-dicarbobenzoxy - L - lysyl)-sulfanilamido]-4,6-diethyl-s-triazine.

No references cited.

HENRY R. JILES, Primary Examiner

C. M. SHURKO, Assistant Examiner

U.S. Cl. X.R.

260—239.6, 239.7, 239.9, 239.75; 424—229

PO-1050
(5/69)

UNITED STATES PATENT OFFICE
CERTIFICATE OF CORRECTION

Patent No. 3,455,911      Dated July 15, 1969

Inventor(s) Karl Volger

It is certified that error appears in the above-identified patent and that said Letters Patent are hereby corrected as shown below:

Column 3, line 43 "$[(C_2H_5O_2=P-O-P=(OC_2H_5)_2]$" should be:

$$[(C_2H_5O)_2^=P-O-P=(OC_2H_5)_2]$$

Column 5, line 18 "5,6-dimethyl-" should be:
5,6-dimethoxy-

Column 5, line 47 "was" should be:
wax

Column 6, line 37 "$^{25}_D$" should be:
$^{22}_D$

Column 6, line 73 "diethyformamide" should be:
dimethylformamide

Column 10, line 36, Claim 26 "oxy-2-[N-" should be:
oxy-2-[N⁴-

SIGNED AND
SEALED
APR 28 1970

(SEAL)
Attest:

Edward M. Fletcher, Jr.
Attesting Officer

WILLIAM E. SCHUYLER, JR.
Commissioner of Patents